United States Patent [19]
Kozuki et al.

[11] Patent Number: 5,079,650
[45] Date of Patent: Jan. 7, 1992

[54] INFORMATION SIGNAL RECORDING AND REPRODUCING APPARATUS WITH A MARK SIGNAL AND FOUR KINDS OF PILOT SIGNALS

[75] Inventors: Susumu Kozuki, Tokyo; Tatsuzo Ushiro, Saitama; Toshiyuki Masui, Kanagawa; Masahiro Takei, Kanagawa; Kenichi Nagasawa, Kanagawa, all of Japan

[73] Assignee: Canon Kabushiki Kaisha, Tokyo, Japan

[21] Appl. No.: 589,764

[22] Filed: Sep. 27, 1990

Related U.S. Application Data

[60] Division of Ser. No. 235,793, Aug. 22, 1988, Pat. No. 4,999,722, which is a continuation of Ser. No. 785,456, Oct. 8, 1985, abandoned.

[30] Foreign Application Priority Data

Dec. 17, 1984 [JP] Japan .................. 59-265661
Dec. 17, 1984 [JP] Japan .................. 59-265662
Dec. 17, 1984 [JP] Japan .................. 59-265663

[51] Int. Cl.$^5$ .................. G11B 15/00; G11B 15/18
[52] U.S. Cl. .................. 360/69; 360/71
[58] Field of Search .................. 360/18, 2 D, 19.1, 27, 360/32, 48, 71, 72.1, 72.2, 73.05–73.07, 74.1, 74.4, 77.14, 77.15, 69, 61, 62

[56] References Cited

U.S. PATENT DOCUMENTS

| | | | |
|---|---|---|---|
| 3,789,138 | 1/1974 | Terada | 360/72.2 |
| 4,558,378 | 12/1985 | Shibata et al. | 360/19.1 |
| 4,651,239 | 3/1987 | Omori et al. | 360/77.14 |
| 4,724,494 | 2/1988 | Koide | 360/19.1 |
| 4,939,596 | 7/1990 | Takayama et al. | 360/27 |

FOREIGN PATENT DOCUMENTS

59-168961 9/1984 Japan .................. 360/77.14

Primary Examiner—Aristotelis Psitos
Assistant Examiner—Steven R. Garland
Attorney, Agent, or Firm—Toren, McGeady & Associates

[57] ABSTRACT

An information signal recording and reproducing apparatus, including a recording arrangement for recording information signals, the recording arrangement including at least one rotary head obliquely tracing a tape-shaped recording medium, the information signals including four kinds of pilot signals for tracking control which have frequency components different from each other a manually operable arrangement for producing a command to change a recording operation of the recording arrangement, a mark signal supplying arrangement for intermittently supplying a mark signal to the recording arrangement for a predetermined period in response to the command produced by the manually operable arrangement, the mark signal mainly having a predetermined frequency component which is distinguishable from frequency components of the four kinds of pilot signals, a reproducing arrangement for reproducing signals recorded on the recording medium, the reproducing arrangement including at least one rotary head obliquely tracing the recording arrangement, a separation arrangement for separating the mark signal from signal reproduced by the reproducing arrangement, the separation arrangement including a band-pass filter through which the predetermined frequency component is passed, and a control arrangement for controlling a reproducing operation of the reproducing arrangement in response to the mark signal separated by the separation arrangement.

7 Claims, 10 Drawing Sheets

INFORMATION SIGNAL RECORDING AND REPRODUCING APPARATUS WITH A MARK SIGNAL AND FOUR KINDS OF PILOT SIGNALS

This is a divisional application of Ser. No. 07/235,793, filed Aug. 22, 1988, now U.S. Pat. No. 4,999,722; which in turn is a continuation application of Ser. No. 06/785,456, filed Oct. 8, 1985, abandoned.

BACKGROUND OF THE INVENTION

1. Field of the Invention

This invention relates to an information signal recording and/or reproducing apparatus and more particularly to an apparatus of the kind arranged to record and/or reproduce an information signal individually into or from each of a plurality of parallel areas longitudinally extending on a tape-shaped record bearing medium.

2. Description of the Prior Art

High density recording has recently become a subject of pursuit in the field of magnetic recording. Video tape recorders (hereinafter referred to as VTR's) also have become capable of performing magnetic recording to a higher degree of density with the travelling speed of the tape lowered. Therefore, the conventional arrangement of using a fixed head for audio signal recording does not give a sufficiently high relative speed and thus results in the degradation of reproduced sound quality. In one of the solutions of this problem, the recording tracks formed by a rotary head are lengthened to have digital audio signals which are compressed on the time base recorded in the lengthened portion of the recording tracks one after another.

Figure 1:
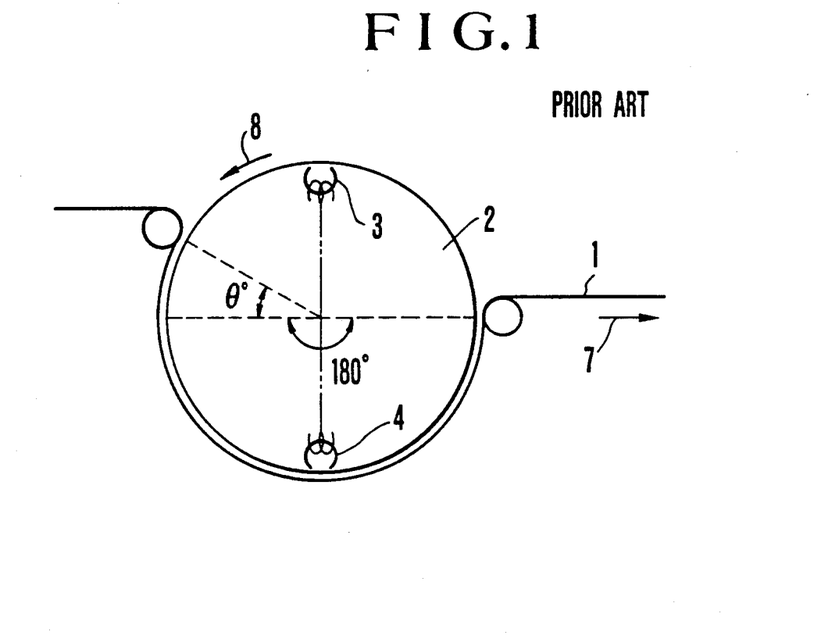
FIG. 1 schematically shows the tape moving system of the conventional VTR.
Figure 2:
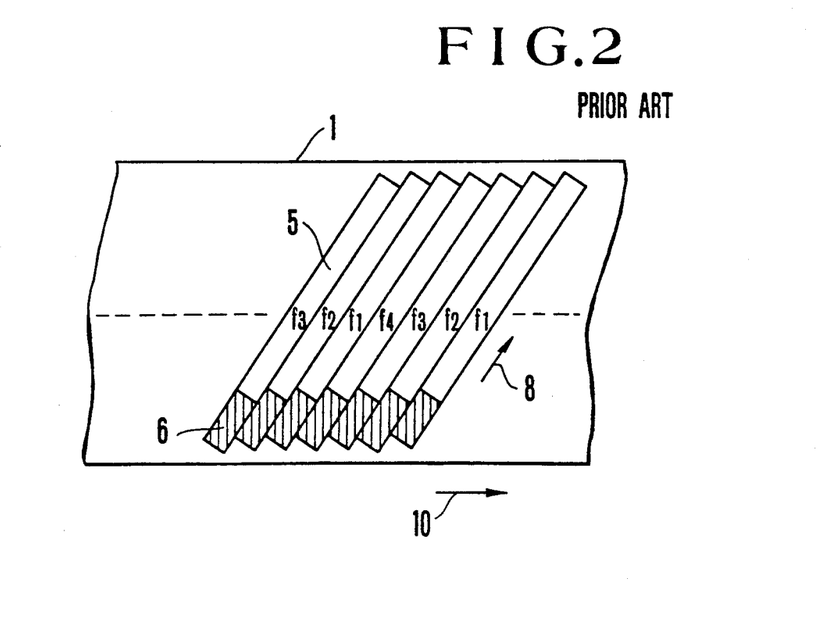
FIG. 2 schematically shows recording tracks formed on a magnetic recording tape by the VTR shown in FIG. 1.

In the case of a VTR of the two-rotary-head helical scanning type, for example, a magnetic recording tape has been arranged to be lapped at least 180 degrees around a rotary cylinder. Then, a VTR of this type has been contrived, according to the above-stated solution, wherein the magnetic recording tape is lapped at least (180 +$\theta$) degrees around the rotary cylinder; and time base compressed audio signals which are pulse code modulated are recorded in the additional portion of $\theta$ degree. FIG. 1 of the accompanying drawings schematically shows the tape transport system of the above-stated VTR. FIG. 2 shows recording tracks formed on a magnetic tape by the VTR of FIG. 1. The illustration includes a magnetic tape 1; a rotary cylinder 2; heads 3 and 4 which are mounted with a phase difference of 180 degrees on the cylinder 2 and have different azimuth angles from each other; video signal recording areas 5 formed on the tape 1; and audio signal recording areas 6 formed also on the tape 1. Each of the video areas 5 is formed with the 180 degree lapped portion of the tape 1 on the rotary cylinder 2 traced by the heads 3 and 4. Each of the audio areas 6 is formed with the angle $\theta$ degree portion of the tape lapped on the cylinder 2 traced by the heads 3 and 4. In FIG. 2, reference symbols f1 to f4 represent the frequency values of tracking pilot signals superimposed on the recording tracks in accordance with a known four frequency method. The frequency values of these pilot signals are in the following relation: $f2-f1=f3-f4\approx fH$ and $f4-f2\approx 2fH$, wherein fH represents the horizontal scanning frequency of the video signal.

With the audio signal which is compressed on the time base and is pulse code modulated (hereinafter referred to as PCM processed) recorded in the audio areas, the audio signal can be reproduced with a high sound quality, which is comparable with the quality attainable by an audio apparatus which is adapted specially for recording and reproduction of an analog signal.

Figure 3:
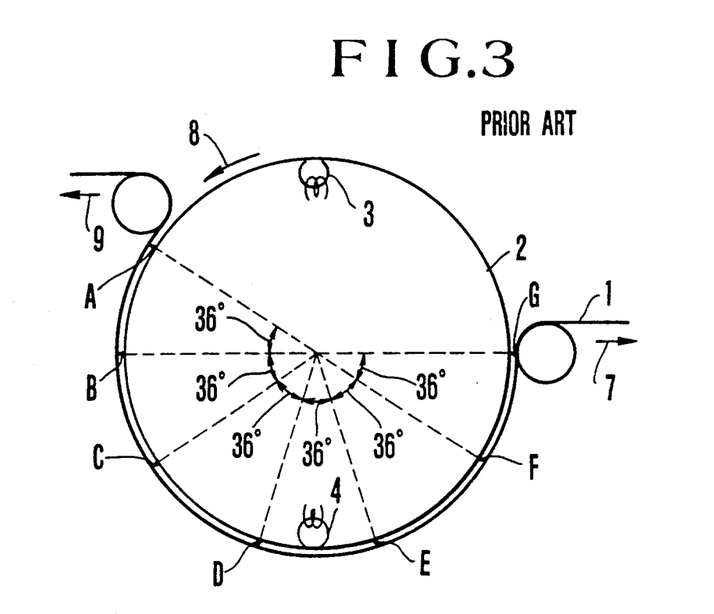
FIG. 3 schematically shows the tape moving system of a multi-channel tape recorder.
Figure 4:
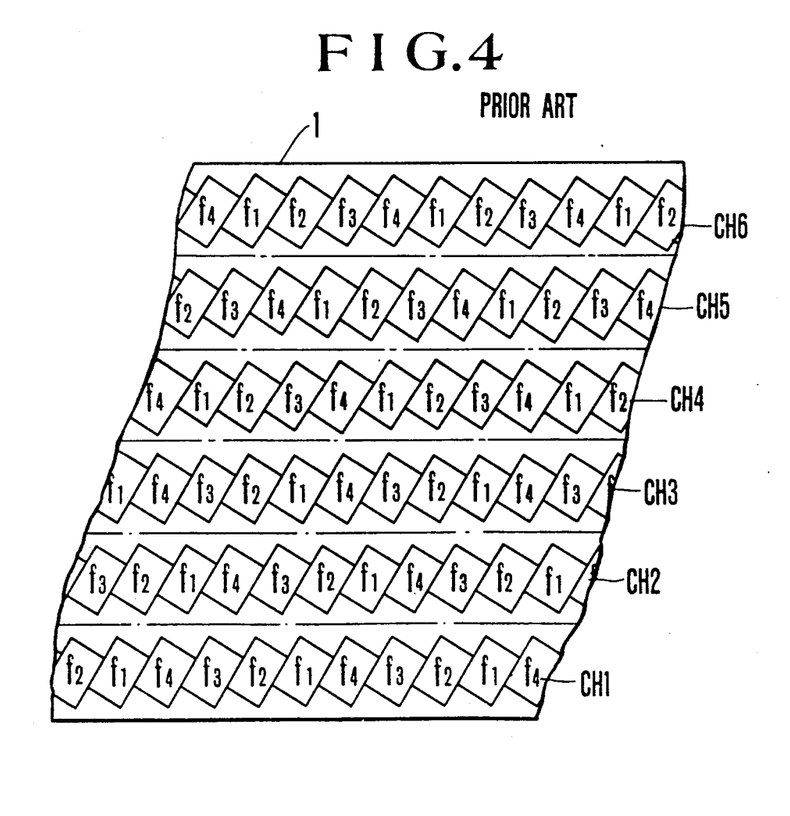
FIG. 4 schematically shows recording tracks formed on a magnetic recording tape formed by the multi-channel tape recorder shown in FIG. 3.

Meanwhile, there has been proposed a method of recording additional audio signals also in the video areas 5 of the VTR of the above-stated type. This method is as follows: Assuming that the angle $\theta$ is arranged to be $\theta=36$, five additional audio areas are obtainable with the rotary head rotated 180 degrees. Then, an arrangement to have time-base compressed audio signals recorded independently in these areas enables audio signals to be recorded in six channels. Thus, an audio dedicated or appropriated tape recorder can be arranged to be capable of recording audio signals in six channels. The following briefly describes this tape recorder:

FIG. 3 shows the tape transport system of the above-stated tape recorder. FIG. 4 shows recording tracks formed on a tape by this tape recorder. The same reference numerals and symbols are used as in FIGS. 1 and 2. While the head 3 or 4 traces distances from a point A to a point B, from the point B to a point C, from the point C to a point D, from the point D to a point E, from the point E to a point F and from the point F to another point G, audio signals can be recorded in areas CH1 to CH6. These areas CH1 to CH6 thus can be used for recording different audio signals therein respectively. An operation called azimuth-overwrite is performed on these areas. However, the tracks of these areas CH1–CH6 do not have to be on the same straight line. Each of the areas CH1–CH6 has one pilot signal recorded therein for tracking control. Different pilot signals are thus recorded in different areas in the order of rotation f1→f2→f3→f4. However, there is no correlation between them.

Referring further to FIG. 3, recording or reproduction is carried out in or from these areas CH1 to CH3 while the tape 1 is travelling at a predetermined speed in the direction of arrow 7 and in or from the areas CH4 to CH6 while the tape is travelling in the direction of arrow 9. Therefore, as shown in FIG. 4, the inclination of the areas CH1 to CH3 somewhat differs from that of the areas CH4 to CH6. With regard to a difference in the relative speed of the tape and the head for these groups of areas, a difference arising from the travel of the tape 1 is extremely small as compared with a difference arising from the rotation of the heads 3 and 4. Therefore, the difference in the relative speed presents no problem.

Figures 5A, 5J:
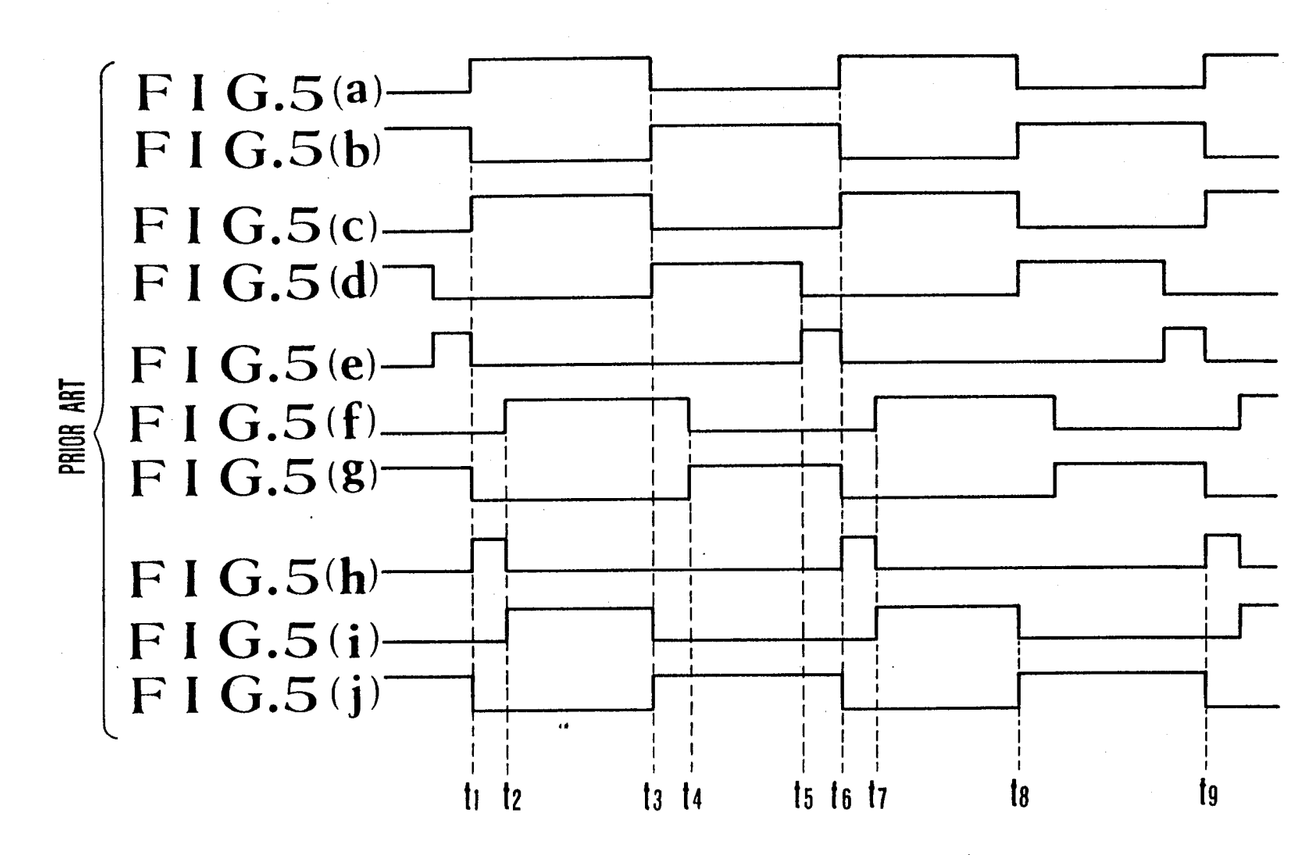

FIGS. 5(a) to 5(j) show in a time chart the recording or reproducing operation of the tape recorder which is arranged as described above. A phase detection pulse (hereinafter referred to as a PG signal) which is generated in synchronism with the rotation of the cylinder 2 as shown at FIG. 5(a). The PG signal is of a rectangular wave of 30 Hz repeating a high level (hereinafter referred to as an H level) and allow level (hereinafter referred to as an L level) alternately with each other at intervals of 1/60 sec. Another PG signal which is of the opposite polarity to the PG signal of FIG. 5(a) is shown in FIG. 5(b). The first PG signal is at an H level while the head 3 is rotating from the point B to the point G of FIG. 3. The other PG signal shown in FIG. 5(b) is at an H level while the other head 4 is rotating from the point B to the point G.

Pulses for reading data are obtained from the PG signal of FIG. 5(a) as shown in FIG. 5(c). The data reading pulses are used for sampling the audio signal of a period corresponding to one field (1/60 sec). FIG. 5(d) shows by H level parts thereof periods provided for signal processing on the one field portion of the sampled audio data by adding an error correcting redundant code or by changing the arrangement thereof by means of a RAM or the like. FIG. 5(e) shows a signal indicating data recording periods at H level parts thereof which represent timing for recording, on the tape 1, the recording data obtained through the signal processing operation mentioned above.

Referring to FIGS. 5(a) to 5(j), the temporal flow of signals are, for example, as follows: The data sampled during a period from a point of time t1 to a point of time t3, i.e. while the head 3 is moving from the point B to the point G, is subjected to a signal processing operation during a period from the point of time t3 to a point of time t5, i.e. while the head 3 is moving from the point G to the point A and are then recorded during a period from the point of time t5 to a point of time t6, or while the head 3 is moving from the point A to the point B. In other words, the data is recorded by the head 3 in the area CH1 as shown in FIG. 4. Meanwhile, the data which is sampled while the PG signal of FIG. 5(b) is at an H level is also processed at a similar timing before it is recorded in the area CH1 by the head 4.

FIG. 5(f) shows another PG signal which is obtained by shifting the phase of the PG signal of FIG. 5(a) to a predetermined degree, which corresponds to one area and is 36 degrees in this specific instance.

An audio signal recording operation using the PG signal of FIG. 5(f) and a PG signal which is not shown but is of an opposite polarity to the former is performed in the following manner: The data which is sampled during a period between the points of time t2 and t4 is subjected to a signal processing operation during a period between the points of time t4 and t6 in accordance with the signal of FIG. 5(g) and is recorded during a period between the points of time t6 and t7 in accordance with the signal of FIG. 5(h). In other words, the data is recorded in the area CH2 of FIG. 4 while the head is moving from the point B to the point C. Meanwhile, another data which is sampled during the points of time t4 and t7 is likewise recorded in the area CH2 by means of the other head during a period between the points of time t4 and t7.

The signal which is recorded in the area CH2 in the manner as described above is reproduced in the following manner:

The head 3 reads the data from the tape 1 in accordance with a signal shown in FIG. 5(h) during the period between the points of time t6 and t7 (and also during the period between the points of time t1 and t2). Then, during the period between the points of time t7 and t8 also (between t2 and t3), the reproduced signal is subjected to a signal processing operation which is carried out, in a manner reverse to the signal processing operation performed for recording, in accordance with a signal shown in FIG. 5(i). In other words, error correction and other processes are carried out during this period. Then, during a period between points of time t8 and t9, the reproduced audio signal which has been thus processed is produced in accordance with a signal shown in FIG. 5(j). The reproducing operation of the head 4 is of course performed with a phase difference of 180 degrees from the above-stated reproduction by the head 3, so that a continuous reproduced audio signal can be obtained.

For other areas CH3 to CH6, it goes without saying that the recording and reproducing operation are performed on the basis of the PG signal of FIG. 5(a) by phase shifting it as much as n×36 degrees. This is independent of the travelling direction of the tape.

As described in the foregoing, a VTR thus can be used solely as a multi-channel audio recording and/or reproducing apparatus. In recording or reproducing a signal or signals continuously over a long period of time with such a multi-channel audio adapted apparatus, a recording operation can be carried out by reversing the travelling direction of the tape near the end of one area which is, for example, the area CH1 before switching to another area which is, for example, the area CH4. In the case of reproduction, however, the multi-channel arrangement causes a difficulty in detecting the timing and an area in which the long continuous signal has been next recorded after one recorded area.

Further, in the case of a normal 8-track type audio tape recorder, the multi-channel arrangement causes a difficulty in recording control signals in additional tracks for carrying out a head searching operation or a forced stopping operation in a known manner.

SUMMARY OF THE INVENTION

It is a general object of this invention to solve the above-stated problem.

It is a more specific object of this invention to provide an information signal recording and/or reproducing apparatus which is capable of efficiently performing recording and/or reproduction into or from a plurality of recording areas formed on a record bearing medium.

It is another object of this invention to provide an information signal recording and/or reproducing apparatus which is capable of smoothly shifting one recording or reproducing area to another at an accurate timing.

Under this object, an information signal recording and/or reproducing apparatus embodying an aspect of this invention comprises: recording and/or reproducing means for recording or reproducing an information signal individually into or from each of a plurality of parallel areas longitudinally extending on a tape-shaped record bearing medium, this means including at least one rotary head; designating means for designating one of the plurality of areas into or from which an information signal is to be recorded or reproduced; and control means for controlling the area designated by the designating means on the basis of the output of the rotary head.

It is a further object of this invention to provide an information signal recording and/or reproducing apparatus which is capable of reversing the travelling direction of a record bearing medium at an accurate timing.

Under that object, an information signal recording and/or reproducing apparatus embodying an aspect of this invention comprises: recording and/or reproducing means for recording or reproducing an information signal individually into or from each of a plurality of parallel areas longitudinally extending on a tape-shaped record bearing medium, the recording and/or reproducing means including at least one rotary head; designating means for designating one of the plurality of areas into or from which an information signal is to be recorded or reproduced; moving means for longitudinally moving the tape-shaped record bearing medium;

and control means for controlling the direction in which the medium is moved by the moving means on the basis of a signal reproduced by the rotary head from the area designated by the designating means.

It is a still further object of this invention to provide an information signal recording and/or reproducing apparatus which is capable of simply and smoothly performing a designating operation in designating one of a plurality of recording or reproducing areas on a record bearing medium.

Under this object, an information signal recording and/or reproducing apparatus embodying an aspect of this invention comprises: recording and/or reproducing means for recording or reproducing an information signal individually into or from each of a plurality of parallel areas longitudinally extending on a tape-shaped record bearing medium, the recording and/or reproducing means including at least one rotary head; designating means for designating one of the plurality of areas into or from which an information signal is to be recorded or reproduced; switch-over means for automatically switching the area to be designated by the designating means from one area to another on the basis of a signal recorded on the record bearing medium, the switch-over means being arranged to have a next area, which is to be designated after a switch-over operation, predetermined on the basis of an area designated by the designating means before the switch-over operation; and manually operable means for arbitrarily setting the area to be designated by the designating means.

These and further objects and features of this invention will become apparent from the following detailed description of embodiments thereof taken in connection with the accompanying drawings.

BRIEF DESCRIPTION OF THE DRAWINGS

FIGS. 5(a) to 5(j) show in a time chart the recording-/reproducing operation of the tape recorder shown in FIG. 3.

DETAILED DESCRIPTION OF THE PREFERRED EMBODIMENTS

Figure 6:
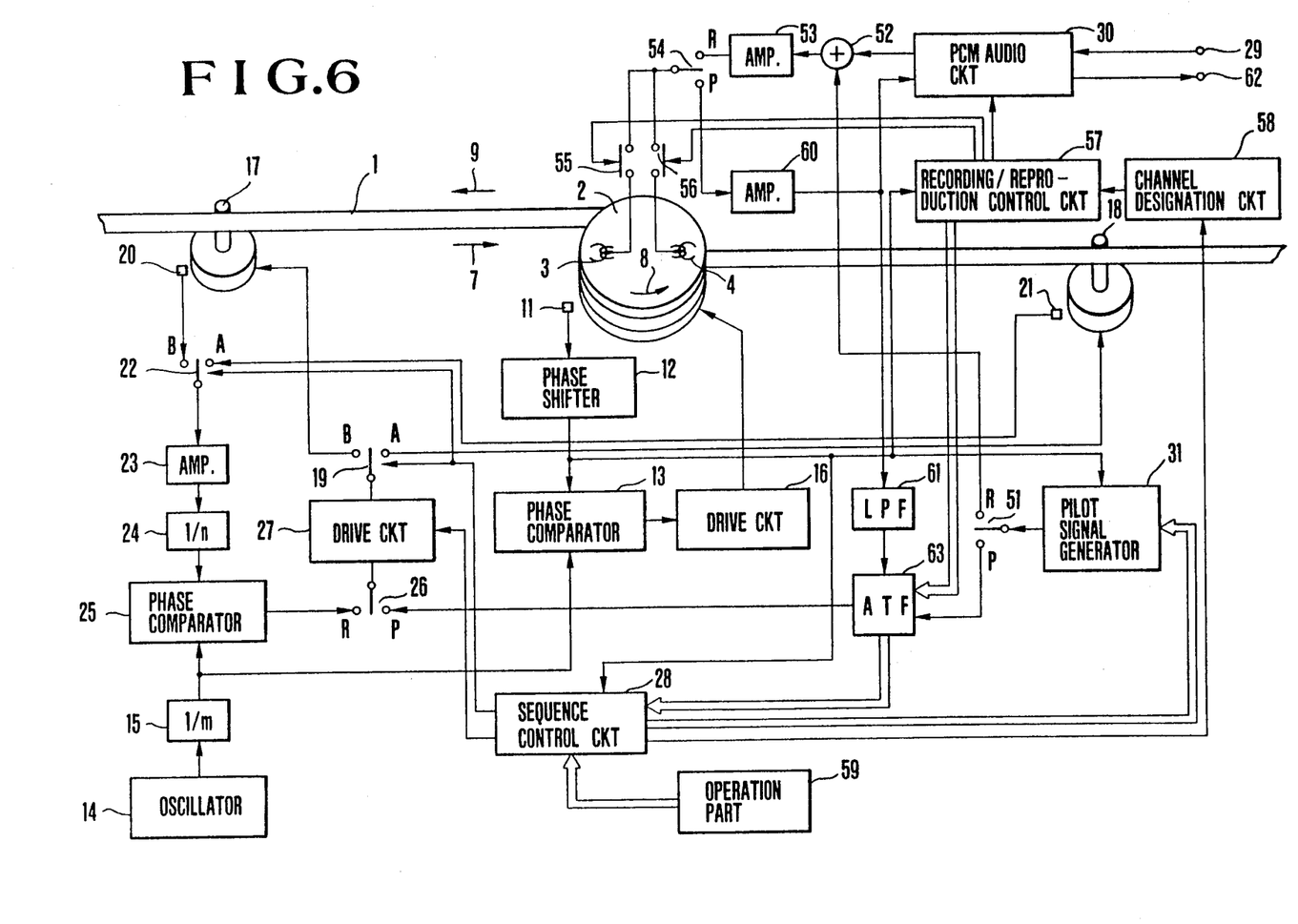
FIG. 6 is a block diagram showing the outline of arrangement of a tape recorder arranged according to this invention as an embodiment thereof.

The details of this invention will be understood from the following description of the embodiments thereof: FIG. 6 shows the outline of the arrangement of a tape recorder embodying this invention as a preferred embodiment thereof. FIG. 6 uses the same reference numerals as those shown in FIGS. 1 and 2. The rotation phase of a rotary cylinder 2 is arranged to be detected by a detector 11 to obtain the PG signal mentioned in the foregoing. The PG signal is supplied via a phase shifter 12 to a phase comparator 13. Meanwhile, the output of a reference oscillator 14 is frequency divided by 1/m at a frequency divider 15 to obtain a pulse signal of frequency 30 Hz. The phase comparator 13 compares the phase of the PG signal with that of this pulse signal. As a result of the comparison, the comparator 13 produces an error signal voltage. A drive circuit 16 is controlled by the error voltage. A cylinder 2 is then driven by the drive circuit 16 to rotate at a predetermined number of revolution and a predetermined phase.

There are provided a pair of capstans 17 and 18 for the purpose of causing the magnetic tape 1 to travel in two directions. Motors which are arranged to drive these capstans 17 and 18 are connected to a switch circuit 19. Meanwhile, two detectors 20 and 21 are arranged to give FG pulses indicative of the rotating phases of the capstans 17 and 18 and are connected to another switch circuit 22. The output of the switch circuit 22 is supplied via an amplifier 23 to a frequency divider 24. The divider 24 frequency divides the output of the switch circuit 22 by 1/n to produce an output of 30 Hz. The 30 Hz output of the divider 24 is supplied to a phase comparator 25. At the comparator 25, the phase of the output of the frequency divider 24 is compared with that of the output of the frequency divider 15. The output of the phase comparator 25 is supplied to one terminal R of a switch circuit 26. Then, in the case of recording, the output of the phase comparator 25 is used for controlling the capstan 17 or 18 to rotate at a predetermined speed by a drive circuit 27. The switch circuits 19 and 22 are arranged to be connected to their terminals A when the tape is to be moved to travel forward (in the direction of arrow 7) by a sequence control circuit 28 and to their terminals B when the tape is to be moved backward (in the direction of arrow 9).

In recording, when an analog audio signal is supplied via a terminal 29 to a PCM audio circuit 30, the audio signal is sampled and signal processed including the process of pulse code modulation (PCM). A recording data is thus obtained through this signal processing operation. Meanwhile, a pilot signal generator 31 which is arranged to produce tracking pilot signals generates pilot signals of four different frequencies f1, f2, f3 and f4 in a predetermined rotational sequence f1→f2→f3→f4.

one for each of recording tracks. An example of details of the pilot signal generator 31 is arranged as shown in FIG. 7.

Figure 7:
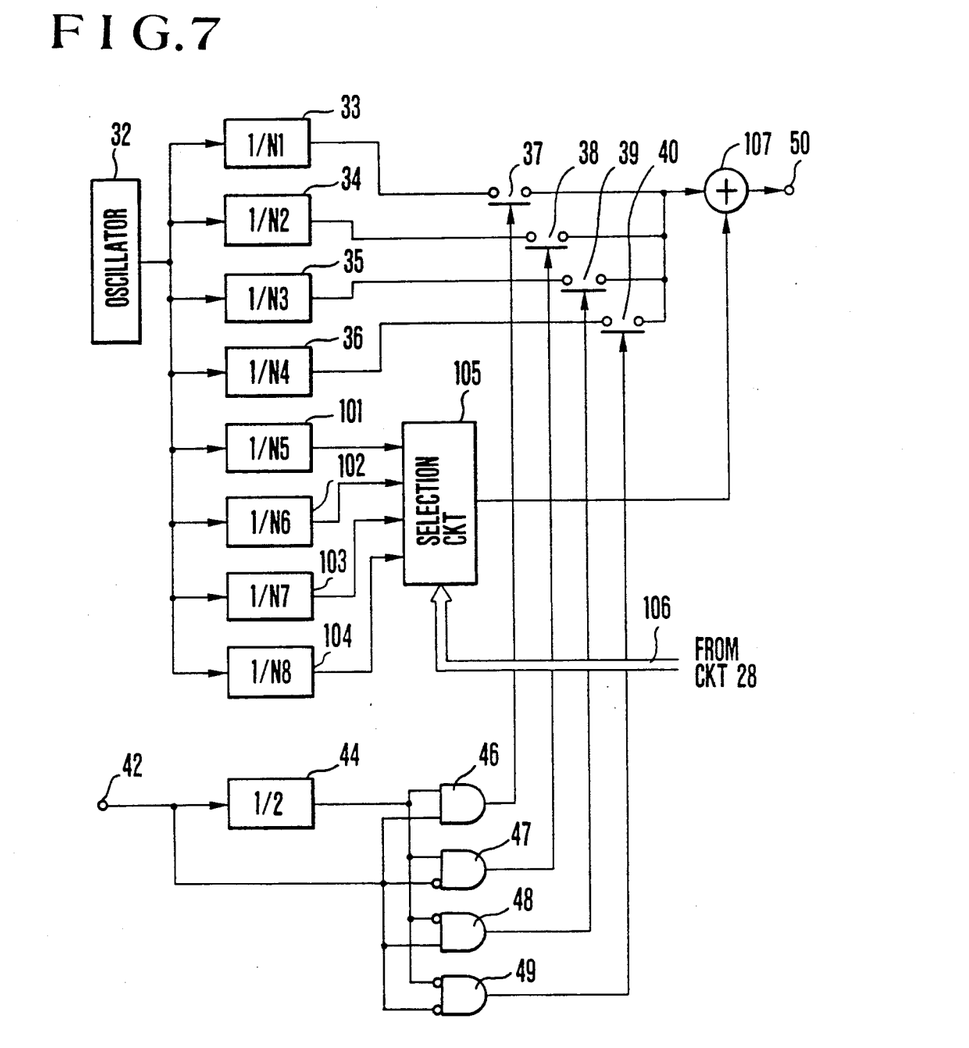
FIG. 7 is a diagram showing by way of example the arrangement of a pilot signal generator included in the embodiment shown in FIG. 6.

Referring to FIG. 7 which shows the pilot signal generator 31 by way of example, the generator 31 includes four frequency dividers 33, 34, 35 and 36 which are arranged to frequency divide the output of a reference oscillator 32 in the ratios of 1/N1, 1/N2, 1/N3 and 1/N4 respectively. The outputs of these frequency dividers are supplied one after another via switch circuits 37, 38, 39 and 40 to a terminal 50 in the predetermined rotation at intervals of 1/60 sec. The output of the terminal 50 is supplied to a switch circuit 51 which is shown in FIG. 6.

A terminal 42 is arranged to receive the PG signal which is produced from the phase shifter 12. The phase of the PG signal from the phase shifter 12 is assumed to be as shown in FIG. 5(a). The PG signal and the output of another frequency divider 44 are supplied to a group of logic gates 46, 47, 48 and 49. Then, according to the logic operation of these gates, switch circuits 37, 38, 39 and 40 turn on in rotation for a period of 1/60 sec one after another. The pilot signals for tracking are supplied to the terminal 50 in rotation in the order of f1→f2→f3→f4.

In the case of recording, the tracking pilot signals which are thus obtained are supplied to an adder 52 via the terminal R of a switch circuit 51. Meanwhile, the audio data for recording which is produced from the PCM audio circuit 30 is also supplied to the adder 52. The adder 52 then multiplexes the audio data with the tracking pilot signals. The output of the adder 52 is then supplied to the rotary heads 3 and 4 via an amplifier 53, the terminal R of a switch circuit 54 and switch circuits 55 and 56.

A recording/reproduction control circuit 57 then controls the timing of the signal processing operation of the PCM audio circuit 30 and the on-off operation timing of the switch circuits 55 and 56 by using the PG signal obtained from the phase shifter 12 in such a way as to have an audio signal recorded in an area corresponding to a channel designated by a channel designation circuit 58. This channel designation circuit is of course arranged to be freely operatable by the operator for designation of a desired channel.

In the event of recording information signals required for reversing the recording direction and bringing a recording operation to a stop, the embodiment is arranged as follows: Let us now assume that the position of reverse recording is to be detected at the time of reproduction. The sequence control circuit 28 supplies a selection circuit 105 with a predetermined data signal 106 for a predetermined period of time either in response to a reverse recording instruction given by a manual operation performed on an operation part 59 or in case that, with recording in one direction approaching an end, this is detected by some suitable means and the recording direction is automatically reversed for further recording.

Then, during this period, at least one of the pilot signals of the specific discriminating frequencies produced from frequency dividers 101 to 104 is taken out from a selection circuit 105 and is supplied to an adder 107. The discriminating pilot signal is mixed with the tracking pilot signal at the adder 107. The adder produces a mixed pilot signal through a terminal 50. In this instance, for example, a signal of a frequency f6 which is produced from the frequency divider 102 is supplied to the adder 107.

The arrangement of the embodiment for detecting at the time of reproduction a part of the record recorded immediately after a start of recording, i.e. for an operation called head searching, is as follows: When recording begins in response to a manual operation on the operation part 59, the sequence control circuit 28 supplied the selection circuit 105 with some predetermined data over a predetermined period of time. After that, at least one of the outputs of the frequency dividers 101 to 104 is selected by the selection circuit 105. The selected output is then added, as the discriminating pilot signal, to the tracking pilot signal. A mixed pilot signal thus obtained is produced from the terminal 50. In this manner, for example, a signal of a frequency f7 which is the output of the frequency divider 103 is added to the tracking pilot signal.

Figure 8:
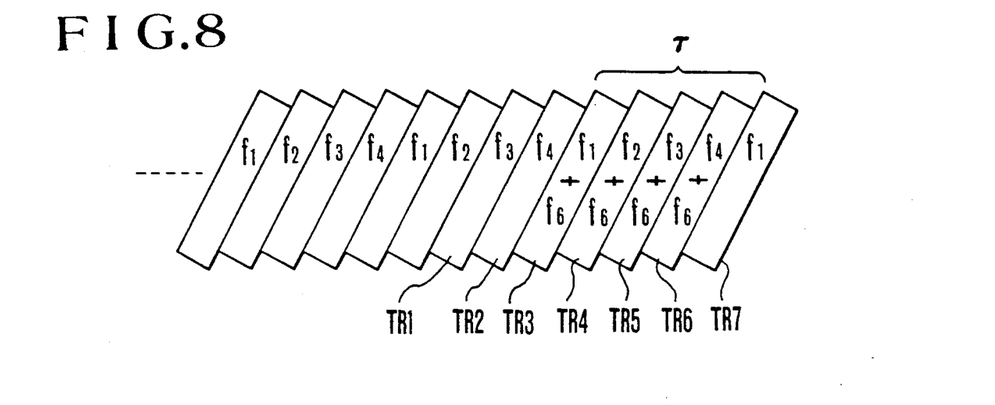
FIG. 8 is an illustration of a recording pattern obtained in one area during a given period by the arrangement shown in FIG. 7.

FIG. 8 shows a recording pattern obtained at the beginning of recording in an applicable area for a designated period. During a period $\tau$, the discriminating pilot signal which is of the frequency 6 is recorded together with tracking pilot signals. After this period, the tracking pilot signals are alone superimposed on an audio signal in a normal manner. The frequency of the discriminating pilot signal must be below the frequency band appropriated to the audio signal. Meanwhile, after the lapse of a designated predetermined period immediately before the above-stated reverse recording, the sequence control circuit 28 causes the drive circuit 27 to bring the travel of the tape 1 to a stop. Following this, the circuit 28 controls the switch circuits 19 and 22 to be in connection with their terminals B and then causes the channel designation circuit 58 to designate a predetermined channel. For example, an area CH4 is designated while recording is in process on an area CH1.

The reproducing operation of the embodiment is as follows: The rotary heads 3 and 4 reproduce the audio data signal, together with the tracking pilot signal and the discriminating pilot signal. These reproduced signals are supplied to the PCM audio circuit 30 and a low-pass filter (LPF) 61 via the switch circuits 55 and 56, the terminal P of the switch circuit 54 and an amplifier 60. Upon receipt of the data signal, the PCM audio circuit 30 performs a processing operation including error correction of the data received, time base expansion, etc. Through these processes, a reproduced audio signal is obtained at the above-stated timing under the control of the recording/reproduction control circuit 57. The audio signal is produced from a terminal 62.

Meanwhile, the reproduced tracking pilot signal and the discriminating pilot signal are obtained from the LPF 61 and are guided to the ATF circuit 63. The ATF circuit 63 also receives via the terminal P of the switch circuit 51 tracking pilot signals from the pilot signal generator 31 in normal rotation. The ATF circuit obtains from these inputs a tracking error signal in a manner as will be described later. The tracking error signal is supplied via the terminal P of the switch circuit 26 to the drive circuit 27. Tracking control is performed by controlling the capstan 17 or 18 in accordance with the tracking error signal.

Figure 9:
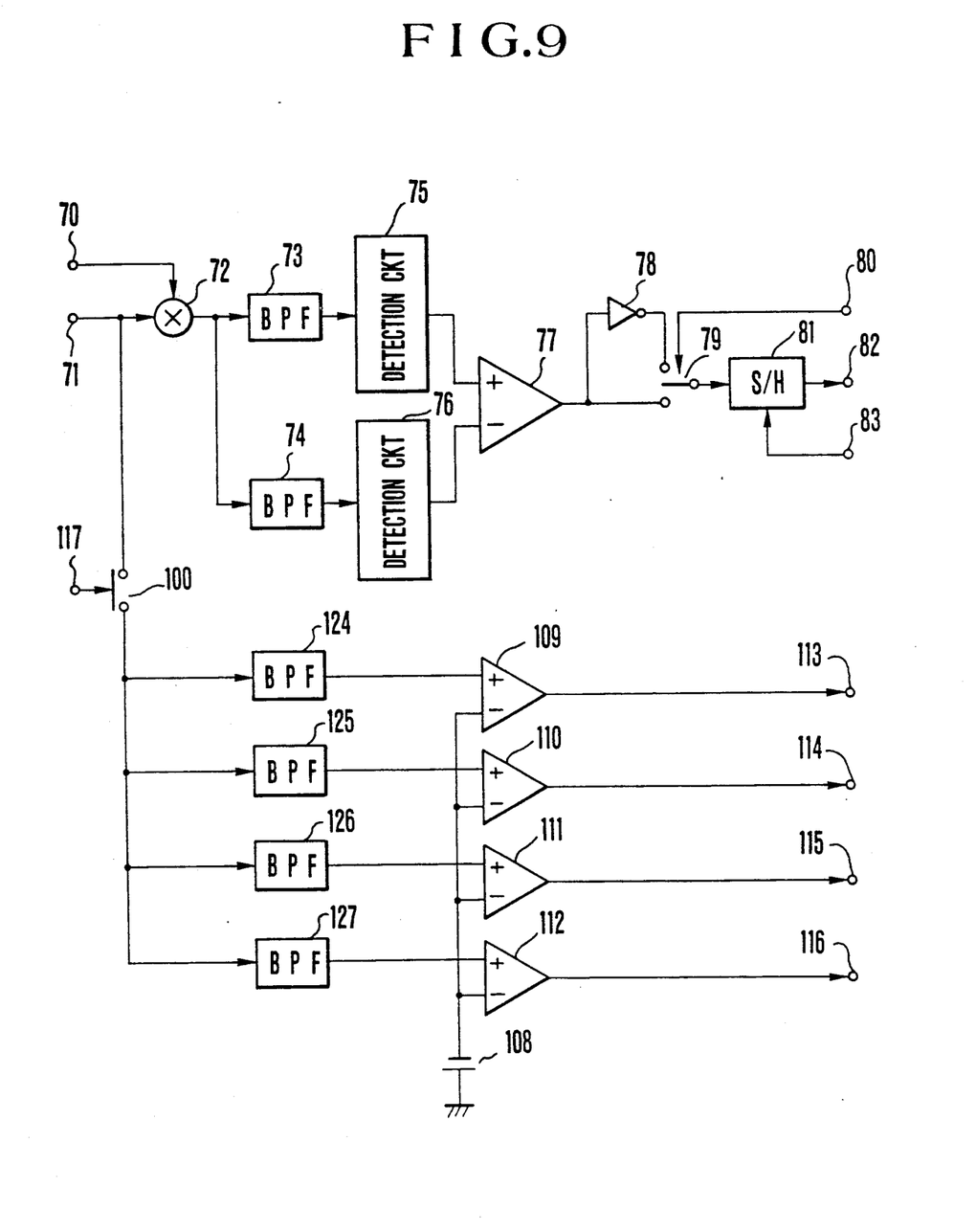
FIG. 9 is a diagram showing by way of example the arrangement of an ATF circuit which is included in the embodiment shown in FIG. 6.

FIG. 9 shows by way of example the details of arrangement of the above-stated ATF circuit 63. Referring to FIG. 9, the tracking pilot signal and the discriminating pilot signal are supplied via the above-stated LPF 61 to a terminal 71 of the ATF circuit. Meanwhile, the pilot signal obtained from the pilot signal generator 31 is supplied via the terminal P of the switch circuit 51 to another terminal 70. A multiplier 72 performs a multiplying operation on these signals. The output of the multiplier 72 is supplied to a tracking error detection circuit consisting of a band-pass filter (BPF) 73 which separates a frequency component fH; another BPF 74 which separates a frequency component 3fH; detection circuits 75 and 76; a comparator 77; an inverting amplifier 78; and a switch circuit 79. The switch circuit 79 is suitably controlled by the PG signal which is supplied to a terminal 80. The output of the switch circuit 79 is supplied to a sample-and-hold circuit 81 (hereinafter referred to as an S/H circuit).

A terminal 83 is arranged to receive a pulse indicative of a timing at which the reproducing head is tracing about the middle part of an applicable record reproducing area. The S/H circuit 81 is arranged to operate in response to this pulse signal. The S/H circuit 81 is thus arranged to produce a tracking error signal, which is supplied to the drive circuit 27 via the terminal P of the switch circuit 26.

In case that a reproducing operation is to be performed on recording tracks in which at least one discriminating pilot signal is recorded within a designated period, the ATF circuit 63 of the embodiment operates as follows: When the head 3 or 4 is tracing the applicable reproducing area, a high level signal is supplied from the recording/reproduction control circuit 57 to a terminal 117. This high level signal closes a switch circuit 100. BPF's 124 to 127 are arranged to separate the frequency components of the discriminating pilot signals. The outputs of these BPF's are arranged to be compared with a reference voltage level of a power source 108 by comparators 109 to 112. The outputs of these comparators 109 to 112 are arranged to be supplied via terminals 113 to 116 to the sequence control circuit 28.

Accordingly, no high level output is obtained at these terminals 113 to 116 during a reproducing operation on a normal recorded portion of the record bearing medium. Whereas, during a reproducing operation on the record portion recorded for a designated period at the commencement of recording, a high level output is obtained from the terminal 114. This output is supplied to the sequence control circuit 28 in the form of a four-bit data. In response to the four-bit data, the sequence control circuit 28 causes the drive circuit 27 to bring the travel of the tape 1 to a stop at the part where recording commenced. Further, for a part recorded immediately before commencement of recording in the reverse direction, the sequence control circuit 28 also causes the drive circuit 27 to bring the travel of the tape 1 to a stop and further causes the connected positions of the switch circuits 19 and 22 to be shifted to the other positions. In that instance, the sequence control circuit 28 further operates to cause the channel designation circuit 58 to designate a channel predetermined to have the head shifted thereto for reproduction in the reverse direction.

Figure 10:
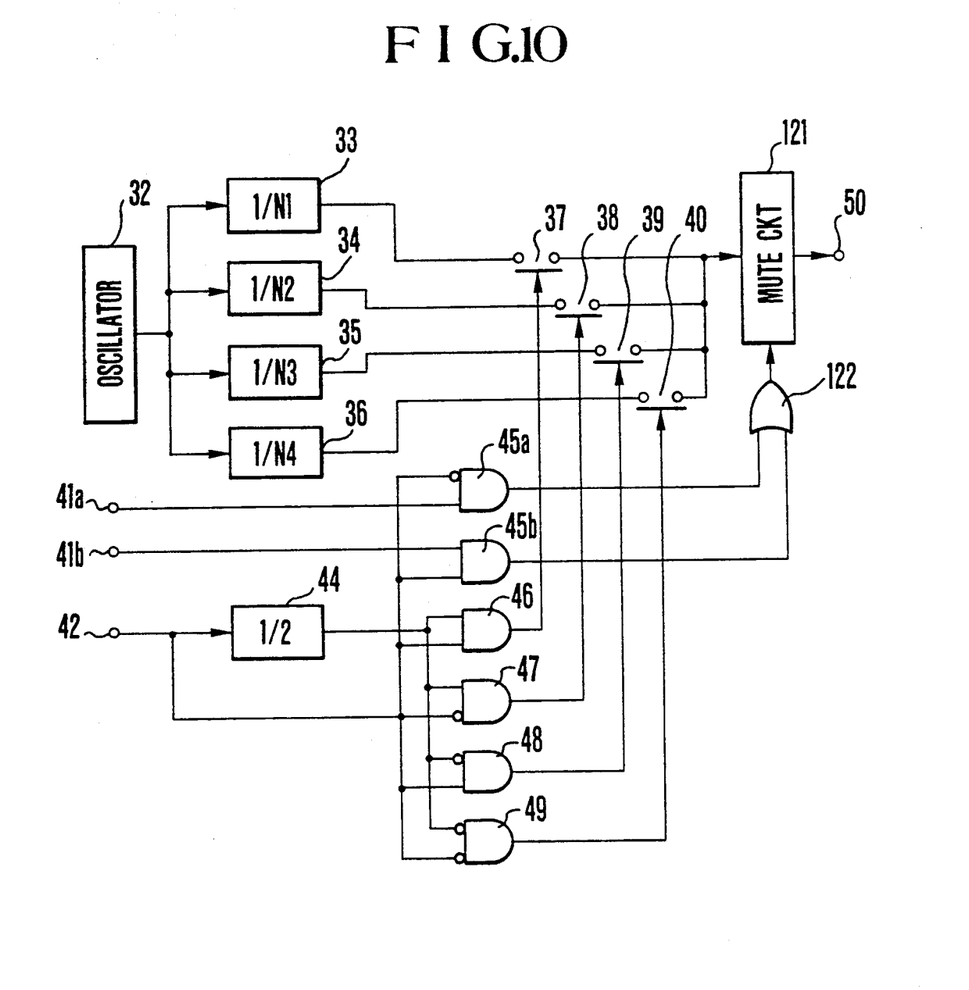
FIG. 10 is a diagram showing another example of the arrangement of the pilot signal generator included in the embodiment of the invention shown in FIG. 6.

FIG. 10 shows another example of arrangement of the pilot signal generator 31. In this example, the same component elements as those shown in FIG. 7 are indicated by the same reference numerals and the details of them are omitted from description here. Terminals 41a and 41b are arranged to receive low level signals from the sequence control circuit 28 during normal recording and reproduction. Under that condition, AND gates 45a and 45b allow the low level signals to pass there as they are. With the pilot signal generator 31 arranged in this manner, in case that information necessary for reversing the recording direction and for bringing a recording operation to a stop is to be recorded, the embodiment operates as follows. Let us assume that, at the time of reproduction, a point at which recording has begun in the reverse direction is to be detected. When a reverse recording instruction is produced by a manual operation on the operation part 59, or in case that a reverse recording mode obtains for further recording with the approach of an end of recording in one direction detected by some means, the sequence control circuit 28 supplies the terminal 41a of the pilot signal generator 31 described above with a high level signal over a predetermined period of time. During this period, the output level of the AND gate 45a becomes high only when the PG signal is at a low level. Therefore, a mute circuit 121 is actuated via an OR gate 122 when the PG signal is at the low level to have thereby the tracking pilot signals of the frequencies f2 and f4 inhibited from being produced from the terminal 50.

Further, at the time of reproduction, a part recorded immediately after the start of recording is detected, that is, the operation called head searching is performed as follows: With recording caused to begin by a manual operation on the operation part 59, the sequence control circuit 28 supplies the above-stated terminal 41b with a high level signal over a predetermined period of time. Then, in this instance, the output level of the AND gate 45 becomes high only when the PG signal is at a high level. As a result, the mute circuit 121 operates only when the PG signal is at the high level. The mute circuit then inhibits the tracking pilot signals of frequencies f1 and f3 from being produced from the terminal 50.

Figure 11:
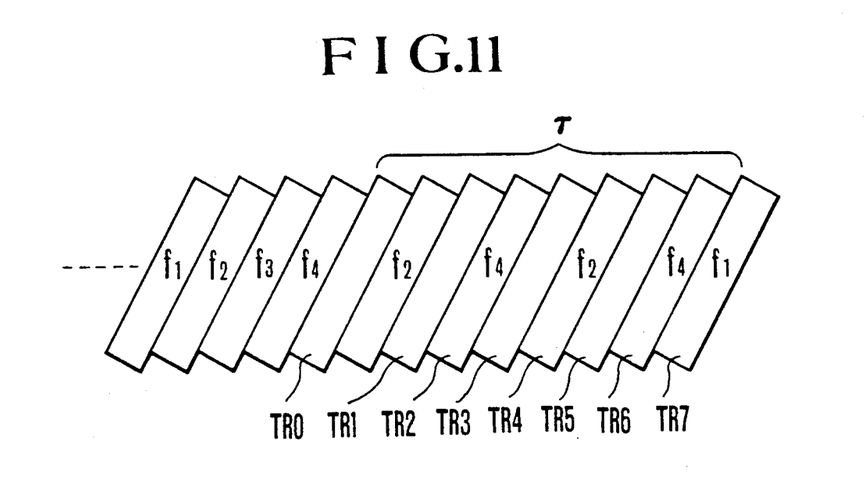
FIG. 11 is an illustration of a recording pattern obtained in one area during a given period with the pilot signal generator arranged as shown in FIG. 10.

FIG. 11 shows a recording pattern obtained in an applicable area during a designated period at the beginning of recording. During a period τ, the pilot signals of frequencies f1 and f3 are not recorded. After the lapse of this period, the pilot signals are superimposed on the audio signal and are recorded in the normal manner.

Figure 12:
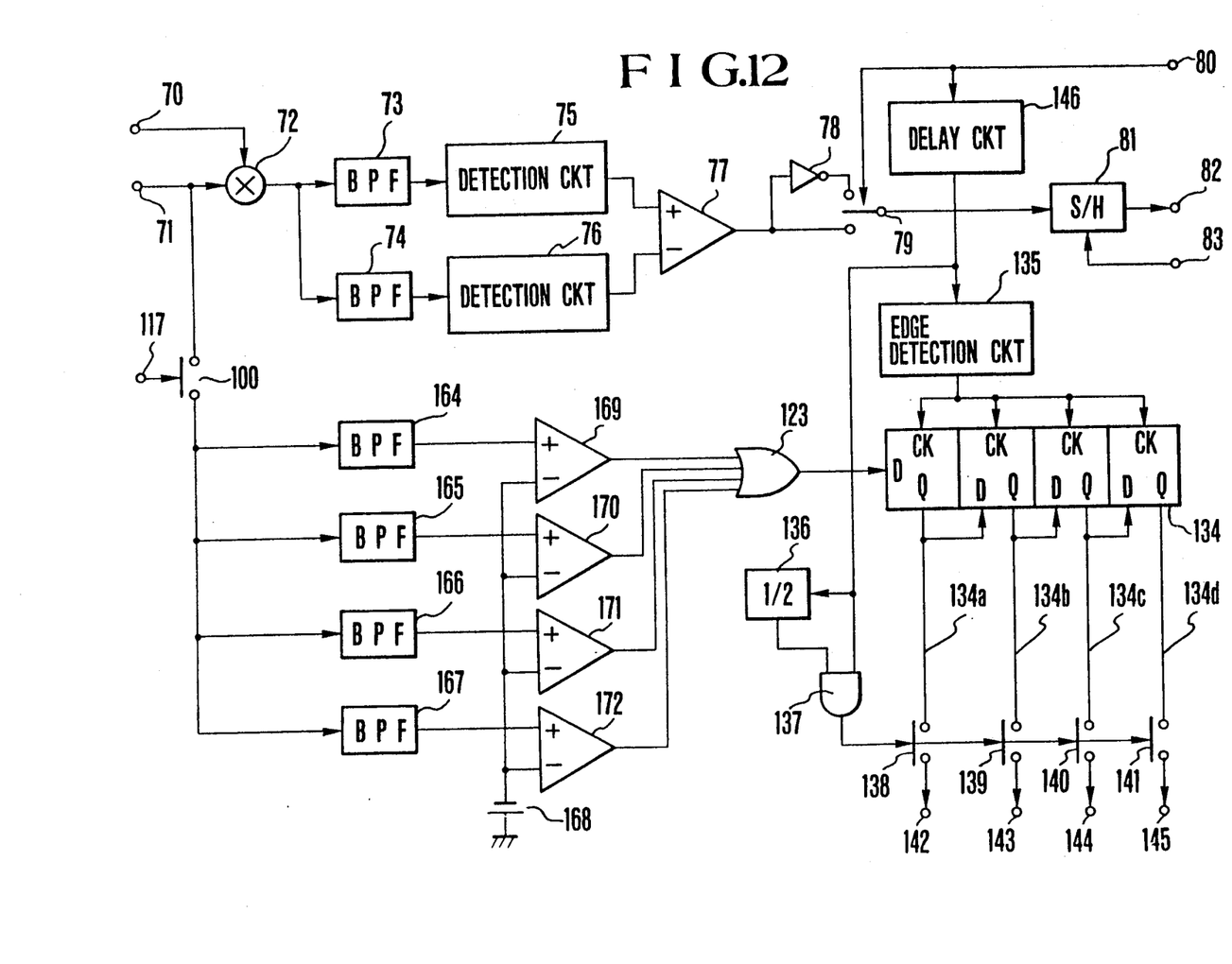
FIG. 12 is a diagram showing another example of the arrangement of the ATF circuit which is included in the embodiment of the invention shown in FIG. 6.

FIG. 12 shows another example of arrangement of the ATF circuit 63 of FIG. 6. In the example shown in FIG. 12, the same component elements as those shown in FIG. 9 are indicated by the same reference numerals.

With the ATF circuit 63 arranged as shown in FIG. 12, a reproducing operation on recording tracks for a designated period during which recording of at least one of the pilot signals has been inhibited as mentioned above is arranged to be performed as follows:

In this example of the ATF circuit 63, BPF's 164, 165, 166 and 167 are arranged to separate signal components of frequencies f1, f2, f3 and f4. The outputs of these BPF's are compared at comparators 169 to 172 with the reference voltage level of a power source 168. Even if any one of these comparators 169 to 172 produces an output, an OR gate 123 supplies a high level output thereof to the data input terminal of a shift register 134.

The shift register 134 is arranged to receive clock pulses. The clock pulses are obtained by detecting, with an edge detection circuit 135, a signal obtained by delaying the PG signal through a delay circuit 146.

Switch circuits 138 and 141 are arranged to supply, via terminals 142 to 145, the sequence control circuit 28 with a four-bit output of the shift register 134. These switch circuits 138 to 141 turn on when an AND signal which is obtained from the delayed PG signal and a signal obtained by frequency dividing it by ½ by a ½ frequency divider 136 (the output of an AND gate 137) is at a high level.

In FIG. 12, the bit outputs 134a to 134d of the shift register 134 indicate whether the pilot signals of frequencies f1 to f4 have been recorded in a part reproduced during an immediately preceding four-field period. The output 134a represents the frequency f1, the output 134b the frequency f4, the output 134c the frequency f3 and the output 134d the frequency f2 respectively.

During a reproducing operation on a normally recorded portion of the record bearing medium, therefore, terminals 142 to 145 supply the sequence control circuit 28 with high level signals. The levels of signals supplied from these terminals 142 to 145 to the sequence control circuit 28 are respectively low, high, low and high during a reproducing operation on the part recorded for a designated period at the start of recording; and are high, low, high and low respectively during a reproducing operation on the part recorded for a designated period immediately before a reversal of the recording direction.

In response to such a four-bit output of the shift register, the sequence control circuit 28 causes the drive circuit 27 to bring the travel of the tape 1 to a stop at the start point of recording. Further, as for the reproduction on the recorded part immediately prior to the reversal of the recording direction, the sequence control circuit 28 not only causes the drive circuit 27 to bring the travel of the tape to a stop but also shifts the connecting positions of the switch circuits 19 and 22. Further, in that instance, the circuit 28 also controls the channel designation circuit 58 to have the latter designate a predetermined channel to which the reproducing operation is to be shifted for reproduction in the reverse direction.

In this example, recording of the pilot signal is arranged to be inhibited in every other track. This arrangement is adopted for the reason that it permits tracking even during the designated period. In cases where accurate tracking is required, a signal of a frequency f4+3fH may be superimposed on the signal recorded in a track TR0 shown in FIG. 11. Further, in this specific example, a change in the recorded sequence of the tracking pilot signals is detected by using each of the pilot signal components. However, this detecting method may be replaced with a method of using a frequency component of 3fH or fH or by using a tracking error signal.

Figure 13:
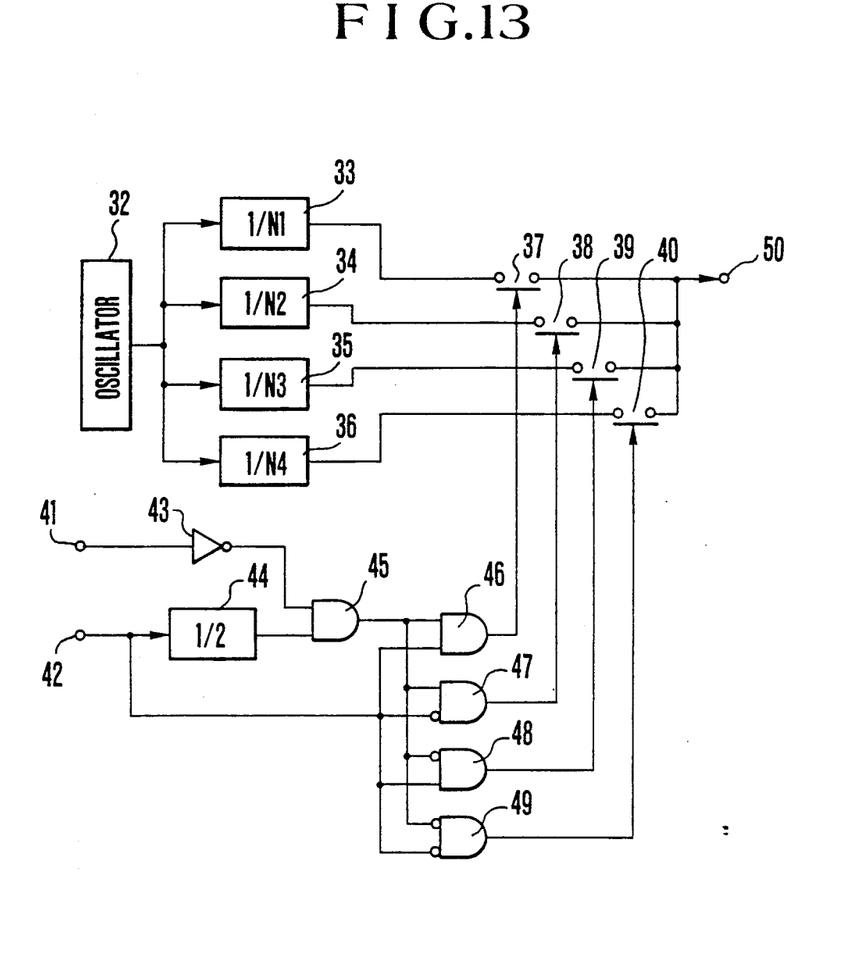
FIG. 13 is a diagram showing a further example of the arrangement of the pilot signal generator included in the embodiment of the invention shown in FIG. 6.

FIG. 13 shows a further example of arrangement of the pilot signal generator 31 shown in FIG. 6. The same component elements as those shown in FIG. 7 are indicated by the same reference numerals in the drawing. In recording information required for reversing the recording direction or for bringing a recording operation to a stop, the embodiment having the pilot signal generator 31 arranged as shown in FIG. 13 operates as follows: When an instruction for recording in the reverse direction is produced by a manual operation on the operation part 59 or when a recording operation is to be further performed after the recording direction has been automatically reversed by some means at a point near the end of recording in one direction, the sequence control circuit 28 comes to supply the terminal 41 of the pilot signal generator 31 with a high level signal for a predetermined period of time.

Figure 14:
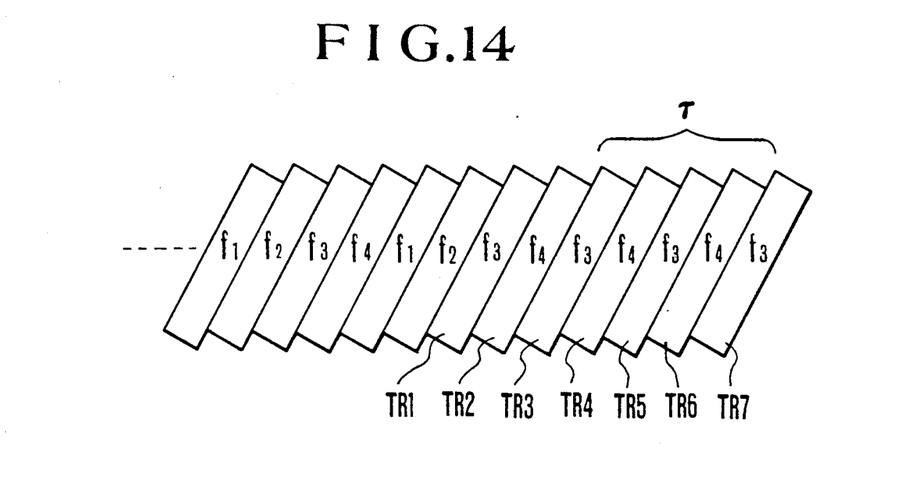
FIG. 14 is an illustration of a recording pattern obtained in one area during a given period with the pilot signal generator arranged as shown in FIG. 13.

Then, during this period, the output level of an inverter 43 becomes low. The output level of an AND gate 45 also becomes low. As a result, the switch circuits 39 and 40 alternately turn on at intervals of 1/60 sec. FIG. 14 shows a recording pattern obtained in an applicable area during this designated period. As shown, a change takes place in the recording rotation of the pilot signals during a period τ. After the lapse of this period, the sequence control circuit 28 causes the drive circuit 27 to bring the travel of the tape 1 to a stop; following that, causes the switch circuits 19 and 22 to shift their connecting positions to terminals B respectively; and brings the tracking pilot signals back to their normal sequence of recording rotation.

Figure 15:
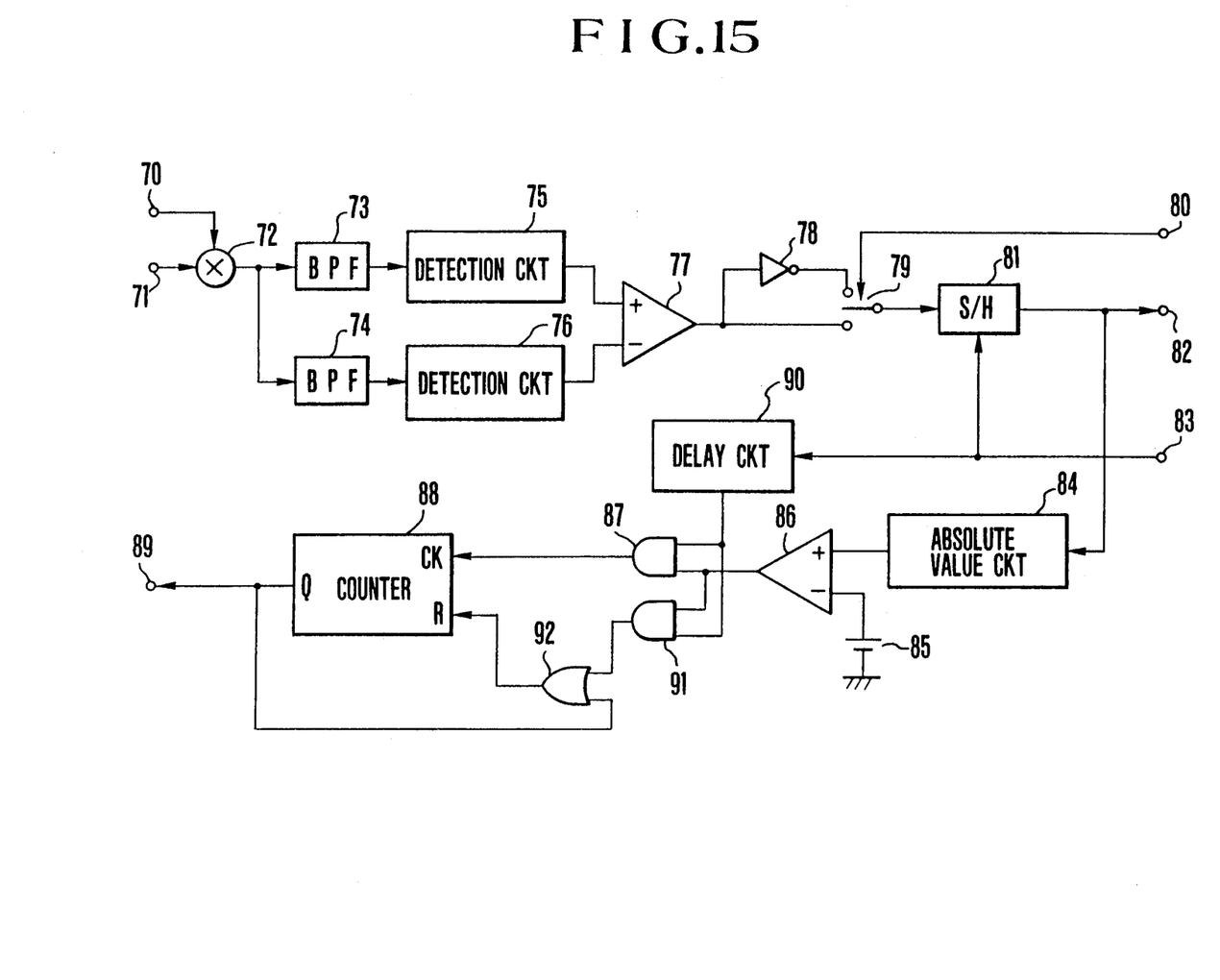
FIG. 15 is a diagram showing a further example of the arrangement of the ATF circuit included in the embodiment of the invention shown in FIG. 6.

FIG. 15 shows a further arrangement example of the ATF circuit 63 shown in FIG. 6. In reproducing a recorded signal or signals from recording tracks during the designated period during which the pilot signals have a different recorded pattern as mentioned in the foregoing, the embodiment having the ATF circuit 63 arranged as shown in FIG. 15 operates in the following manner:

The output of an S/H circuit 81 is supplied via an absolute value circuit 84 to a comparator 86. The comparator 86 compares the output of the S/H circuit 81 with a threshold voltage Vth of a power source 85. The comparator 86 then produces the output of the S/H circuit 81 which is a high level signal for a one-field period when the tracking error exceeds a reference value. During each of such one-field periods, an AND gate 87 produces a single pulse which is obtained by delaying through a delay circuit 90 the above-stated timing pulses supplied to a terminal 83.

Assuming that the reproducing operation is being performed on the recording track TR1 shown in FIG. 14, the output of the absolute value circuit 84 does not come to exceed the reference value up to that track. However, the output of the pilot signal generator 31 obtained while the reproducing operation is performed on another recording track TR2 is the pilot signal of frequency f1. Then, although the frequency component fH is not included in the output of a multiplier 72, the output of the multiplier 72 includes the frequency component 3fH in an amount above twice as much as a normal amount thereof. As a result of this, the output of the absolute value circuit 84 comes to exceed the reference value. A counter 88 then begins to up count. After that, the output of the absolute value circuit 84 continues to exceed the reference value while the reproducing head is tracing the track TR3 and tracks subsequent thereto. The counter 88 up counts accordingly. When the counted value of the counter 88 reaches a value (which is 4 in this particular example) corresponding to the length of the above-stated designated period, the level of the Q output of the counter 88 becomes high. The high level Q output is produced from a terminal 89.

The counter 88 is reset when the reproduction comes to a field where the Q output thereof and the output of the absolute value circuit 84 no longer exceed the reference value. When a high level pulse is thus produced from the terminal 89, the pulse is supplied to the sequence control circuit 28. In response to this, the control circuit 28 causes the drive circuit 27 to bring the travel of the tape 1 to a stop and then changes the connected positions of the switch circuits 19 and 22. The control circuit 28 also causes the channel designation circuit 58 to designate a predetermined channel to which the reproducing channel is to be shifted with the reproducing direction reversed.

In the example described above, the change in the sequence of rotation of the tracking pilot signals is arranged to be detected by means of a tracking error detected by using the frequency component 3fH or fH or by using the frequency components f1 to f4 included in the output of the multiplier 72 instead of the tracking error signal.

Further, in the example described, the description has covered only the reverse reproduction which is performed by shifting the reproducing channel to a channel designated at the time of reproduction. However, the channel to which the operation is to be shifted may be automatically designated by arranging the above-stated designated period to be variable or by setting a plurality of different rotation changing patterns.

In each of the examples given in the foregoing, a reverse reproduction is arranged to be performed by shifting a reproducing operation to a channel designated during reproduction. However, the shifting channel can be automatically designated by correlating each channel to each discriminating pilot signal pattern.

What is claimed is:

1. An information signal recording and reproducing apparatus, comprising:
    (a) recording means for recording information signals, said recording means including at least one rotary head obliquely tracing a tape-shaped recording medium, said information signals including four kinds of pilot signals for tracking control which have frequency components different from each other;
    (b) manually operable means for producing a command to change a recording operation of said recording means;
    (c) mark signals supplying means for intermittently supplying a mark signal to said recording means for a predetermined period in response to the command produced by said manually operable means, said mark signal mainly having a predetermined frequency component which is distinguishable from frequency components of said four kinds of pilot signals;
    (d) reproducing means for reproducing signals recorded on said recording medium, said reproducing means including at least one rotary head obliquely tracing said recording means;
    (e) separation means for separating said mark signal from signals reproduced by said reproducing means, said separation means including a band-pass filter through which said predetermined frequency component is passed; and
    (f) control means for controlling a reproducing operation of said reproducing means in response to said mark signal separation by said separation means.

2. An apparatus according to claim 1, wherein said mark signal includes a pilot signal which has a predetermined frequency component different from frequency components of the four kinds of pilot signals.

3. An apparatus according to claim 1, wherein said command produced by said manually operable means in a command to start a recording operation of said recording means.

4. An information signal recording and reproducing apparatus, comprising:
    (a) recording means for recording information signals, said recording means including at least one rotary head obliquely tracing a tape-shaped recording medium, said information signals including four kinds of pilot signals for tracking control which have frequency components different from each other;
    (b) transporting means for transporting said tape-shaped recording medium in a longitudinal direction thereof;
    (c) manually operable means for producing a command to change a transporting operation of said transporting means;
    (d) mark signal supplying means for intermittently supplying a mark signal to said recording means for a predetermined period in response to the command produced by said manually operable means, said mark signal mainly having a predetermined frequency component which is distinguishable from frequency components of said four kinds of pilot signals;
    (e) reproducing means for reproducing signals recorded on said recording medium, said reproducing means including at least one rotary head obliquely tracing said recording means;
    (f) separation means for separating said mark signal from signals reproduced by said reproducing means, said separation means including a band-pass filter through which said predetermined frequency component is passed; and
    (g) control means for controlling the transporting operation of said transporting means in response to said mark signal separation by said separation means.

5. An apparatus according to claim 4, wherein said mark signal includes a pilot signal which has a predetermined frequency component different from the frequency components of the four kinds of pilot signals.

6. An apparatus according to claim 4, wherein said command produced by said manually operable means is a command to start a transporting operation of said transporting means.

7. An apparatus according to claim 4, wherein said command produced by said manually operable means is a command to change a transporting direction of the recording medium by said transporting means.

* * * * *